(12) United States Patent
Marimuthu et al.

(10) Patent No.: US 9,402,004 B2
(45) Date of Patent: Jul. 26, 2016

(54) METHOD AND SYSTEM FOR MANAGING DATA USAGE FOR A SERVICE ACROSS MULTIPLE DEVICES

(71) Applicant: Verizon Patent and Licensing Inc., Arlington, VA (US)

(72) Inventors: Ramesh Marimuthu, Edison, NJ (US); Shamik Basu, Lake Hiawatha, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 108 days.

(21) Appl. No.: 14/319,872

(22) Filed: Jun. 30, 2014

(65) Prior Publication Data

US 2015/0381826 A1 Dec. 31, 2015

(51) Int. Cl.
*H04M 11/00* (2006.01)
*H04M 15/00* (2006.01)
*H04W 24/10* (2009.01)

(52) U.S. Cl.
CPC ............ *H04M 15/886* (2013.01); *H04M 15/58* (2013.01); *H04M 15/61* (2013.01); *H04M 15/887* (2013.01); *H04W 24/10* (2013.01)

(58) Field of Classification Search
CPC ... H04M 15/886; H04M 15/58; H04M 15/61; H04M 15/887; H04W 24/10
USPC ........................................ 455/405, 406; 726/8
See application file for complete search history.

(56) References Cited

U.S. PATENT DOCUMENTS

| | | | |
|---|---|---|---|
| 2015/0200933 A1* | 7/2015 | Charette | H04L 63/0815 726/8 |
| 2015/0237215 A1* | 8/2015 | Leemet | H04W 4/26 455/405 |
| 2015/0237490 A1* | 8/2015 | Chang | H04W 4/26 455/406 |

* cited by examiner

*Primary Examiner* — Amancio Gonzalez

(57) ABSTRACT

An approach for managing the amount of data spent by one or more user devices on one or more services is described. A data usage analysis platform receives an input for specifying a data budget associated with a service, wherein the service operates on one or more devices. The data usage analysis platform also monitors data usage data associated with the service across the one or more devices. Still further, the data usage analysis platform presents a report of the data usage data with respect to the data budget.

20 Claims, 12 Drawing Sheets

100

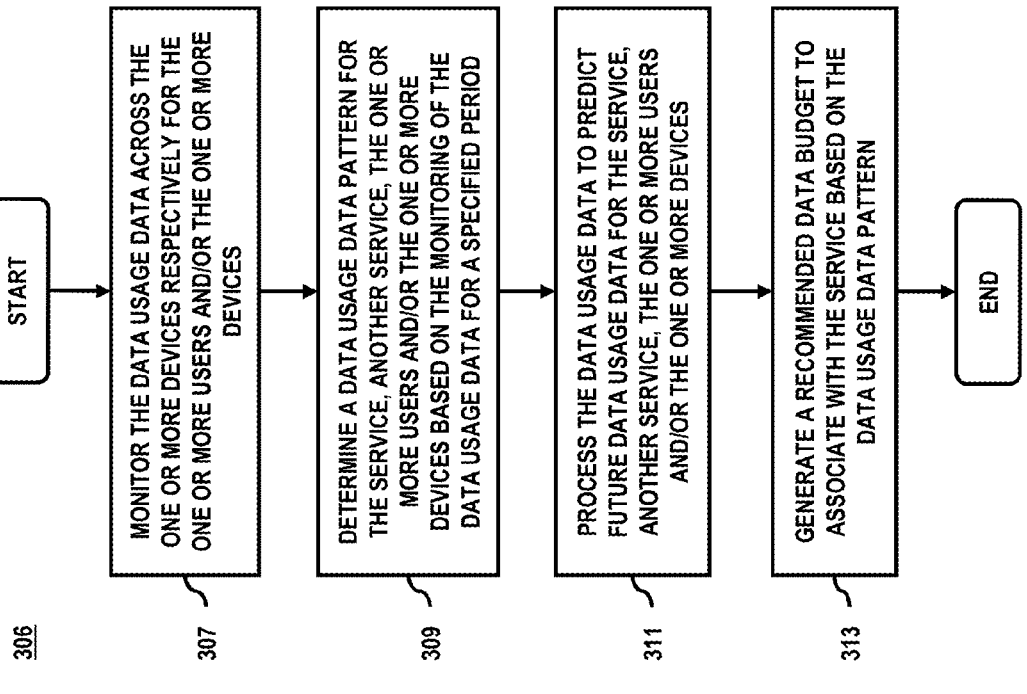
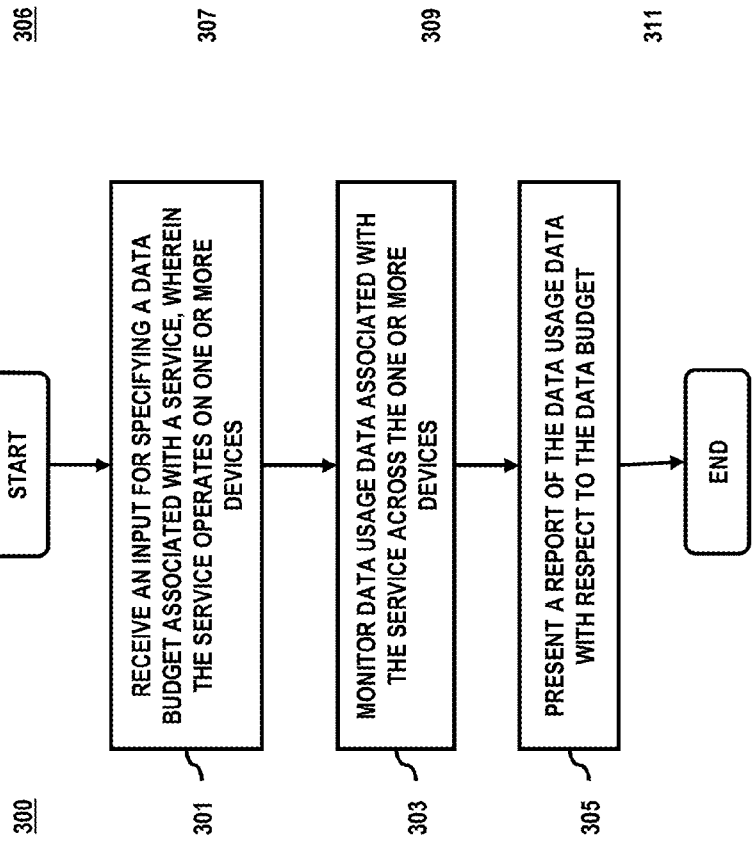

EMAIL APPLICATION

FROM: spending_analysis@serviceprovider.com
MSSG: Monthly Data Spending Report

Joe, your customized data spending report for the June billing period is ready. You can change your report settings anytime via the spending analysis application or by *logging* into your online portal. If you have any questions, please call our customer service center at 800-555-5555.

Plan Details — 465
Subscriber: Joe; Data Plan: 25GB/Mo = $100
Users: Joe (Device 1), Kay (Device 1) and Leo (Device 2)
Registered Devices: Device 1 and Device 2

Budget Settings — 467
Total Budget for the Users: 10GB/mo = $40/mo
Joe (4 GB = $16/mo), Kay (3GB = $12/mo) and Leo (3GB = $12/mo)

Spending Breakdown in June by User — 469
Device 1 (Joe)- 4GB/$40/40%
  Activity: Movie Goo (Streaming-Movies) 10% = $4, ACME Music (Streaming - Music) 10% = $4, Newsfeed (Media - Content) 20% = $8, Big Mail (Email - Content) 20% = $8, GoBEE Social (Social - Content) 5% = $2 and web browsing % = $2

- Total Spending = 2.8GB = $28 = 70%  |  Total Unused = 1.2GB = $12 = 30%
- Avg Monthly Spending = 2.2GB = $22 = 55%  |  User Rank = 2<sup>nd</sup>

— 475

Spending Breakdown in June by User — 471
Device 1 (Kay)- 3GB/$30/30%

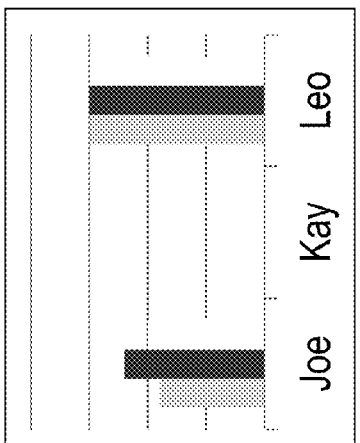

— 473

Joe    Kay    Leo

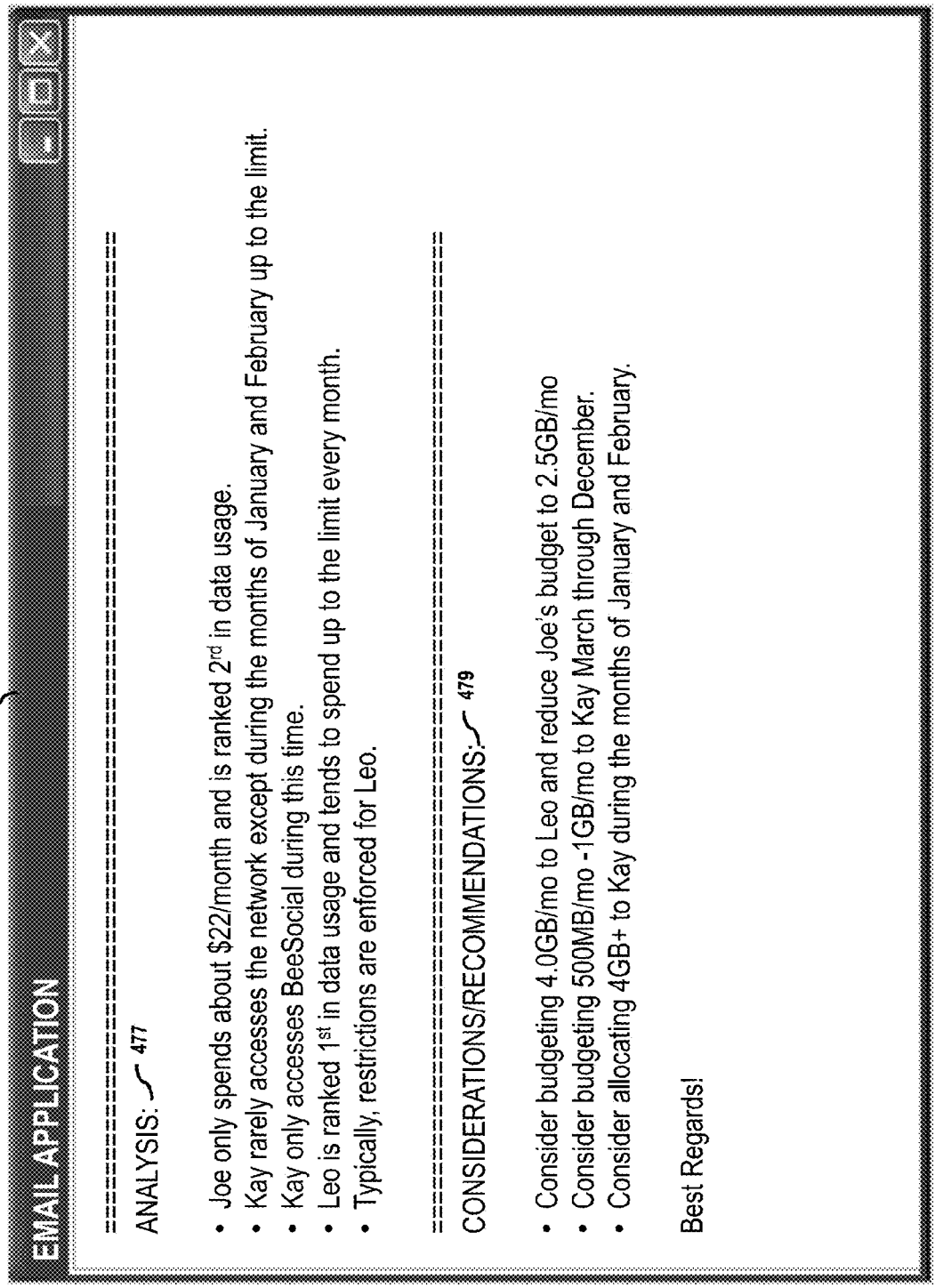

US 9,402,004 B2

METHOD AND SYSTEM FOR MANAGING DATA USAGE FOR A SERVICE ACROSS MULTIPLE DEVICES

BACKGROUND INFORMATION

Service providers are continually challenged to deliver value and convenience to consumers by providing compelling network services and advancing the underlying technologies. One area of interest has been providing wireless device users with a convenient means of managing the amount of data they consume. For example, some mobile device users have wireless data plans that limit them to a predefined amount of data or bandwidth capacity (e.g., 1-5 Gigabytes (GB)) on a monthly basis. Unfortunately, this data may be easily consumed as the user employs their device to access streaming media services, execute video chat sessions or perform other data intensive activities. Moreover, the limited amount of data may be spent even faster when other mobile devices are associated with the same data plan.

Based on the foregoing, there is a need for managing the amount of data spent by one or more user devices on one or more services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3C are flowcharts of processes for managing the amount of data spent by one or more user devices on one or more services, according to various embodiments;

FIGS. 4A-4F are diagrams of user interfaces utilized in the processes of FIGS. 3A-3C according to various embodiments;

DESCRIPTION OF THE PREFERRED EMBODIMENT

An apparatus, method and software for managing the amount of data spent by one or more user devices on one or more services is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
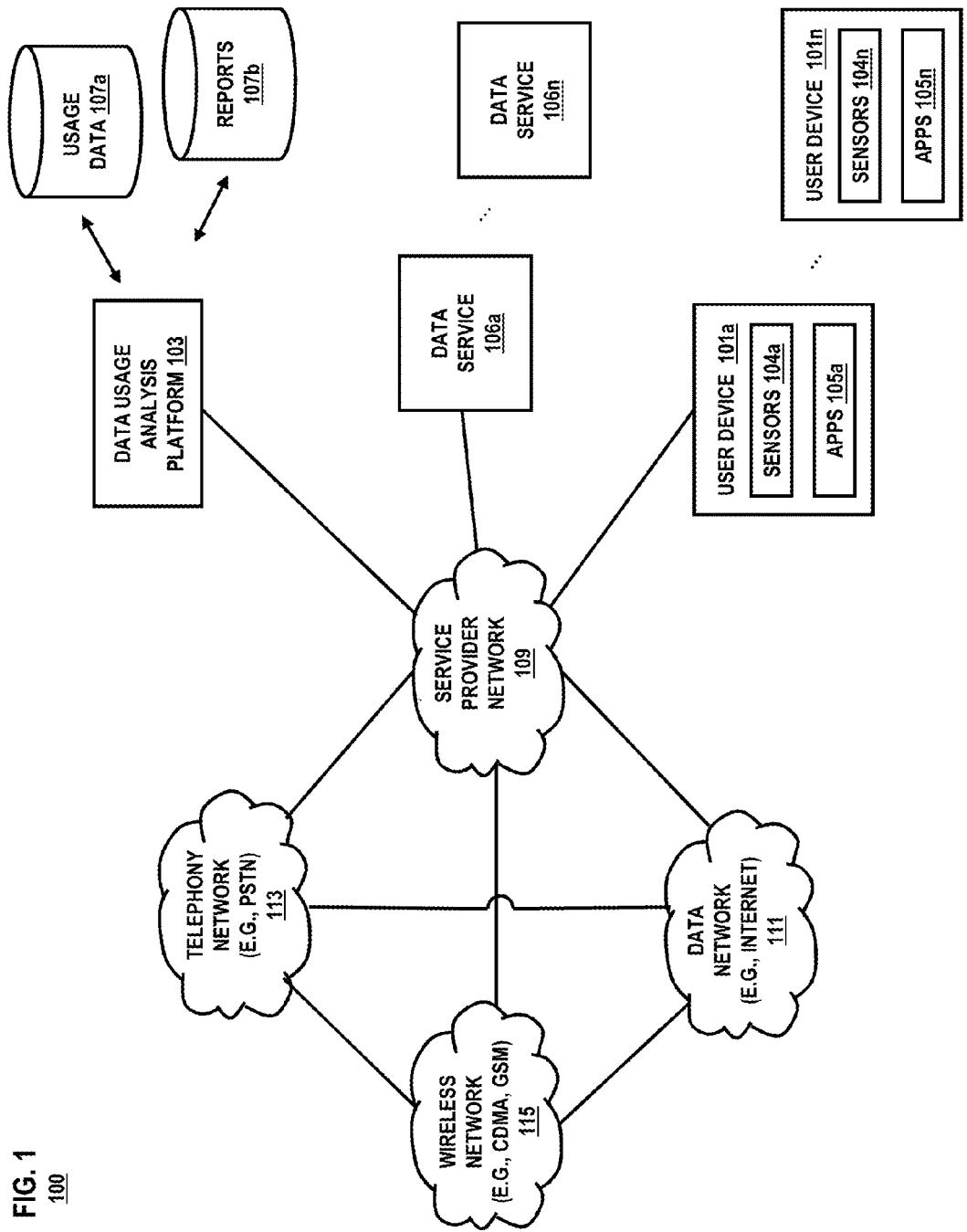
FIG. 1 is a diagram of a system for managing the amount of data spent by one or more user devices one or more services, according to one embodiment.

FIG. 1 is a diagram of a system for managing the amount of data spent by one or more user devices on one or more services, according to one embodiment. For the purpose of illustration herein, the spending of data may pertain to an amount of use and/or rate of consumption of data and/or bandwidth by a user device. Moreover, the use of data may be monitored by users or by a service provider in accordance with a data plan, wherein the data plan defines the total amount of bandwidth available to a subscribed user of a service provider network 109.

As mentioned previously, data may be used by devices in connection with the execution of various services where data is required to be transmitted and/or acquired via the network 109 in order to fulfill the needs of the user. For example, a user may operate a service for streaming music or movie content to the user device on demand for entertainment purposes. As another example, the user device may execute a service for enabling a video conference session or for engaging in social networking with peers. Still further, many devices are now equipped with sensors for exchanging (e.g., sending and receiving) user, device, group and environmental data with a plethora of real-time traffic, weather, exercise, shopping, financial and health monitoring or optimization services.

With the rise in popularity of such data rich services, users must be vigilant in how they budget/use their data; especially in cases where the user has a limited amount of data to use for accessing a service provider network (e.g., per their chosen data plan). For example, a user that enjoys streaming movie services, which typically requires the use of much data, may quickly consume the limited amount of data afforded them on a monthly basis by the provider of the network. Unfortunately, there is no convenient means for enabling a user to monitor and manage data usage with respect to different data services. Moreover, there is no convenient means of enabling a user to properly budget a limited amount of data that is to be shared by multiple users or multiple devices—i.e., a group of device users that share a pool of data per a single data plan.

To address this problem, system 100 of FIG. 1 enables users to manage the use, or spending, of data for one or more devices that operate a service. In one embodiment, the system 100 includes a data usage analysis platform 103, which facilitates the collecting, monitoring and analysis of data usage data regarding one or more user devices 101a-101n (referred to herein collectively as user devices 101) as they interact with one or more data services 106a-106n (referred to herein collectively as data services 106). In addition, the platform 103 may enable the generation of predictions and associated recommendations for budgeting the use of data by the one or more user devices and/or users based on the aggregation and analysis of the data usage data over a specified period (e.g., a week, a month).

In one embodiment, the data usage data may include any information for indicating the amount of data/bandwidth (e.g., a number of megabytes (MB)) used, a rate of consumption of data/bandwidth (e.g., a number of bytes per second), session information (e.g., session identifier and acknowledgement information), or the like. In addition, the data usage data may include information for specifying the type of service performed, temporal information regarding the service, network identification information regarding the user devices 101, network identification information regarding the data services utilized by the user devices 101, packet configuration/type information, or the like. Of note, the data usage data may be stored to a database 107a of the data usage analysis platform 103 for supporting real-time/current and subsequent analysis of the data accordingly.

In one embodiment, the data usage data is monitored and analyzed with respect to a user specified data budget input. By way of example, the data budget may be provided as input per a user interface of the data usage analysis platform 103. The user interface may be rendered to the display of a user device 101 by the platform 103 as a configuration tool, in connection with another application 105 of the device 101, with respect to a login interface to the network 109, or a combination thereof.

The data budget may be a value representing a portion of a total amount of data that is available for usage by a specific user, a specific user device, or a group thereof for accessing a specific data service 106. Thus, the input may specify a data budget for the users individually or cumulatively on a user-by-user basis, a device-by-device basis, or a combination thereof. An input may be provided for each respective data service 106 operable by the one or more users and/or devices 101.

The data budget may be specified as an amount of bytes or a percentage of an amount of bandwidth or data to be associated with a data service 106 for the one or more users and/or devices 101. Alternatively, the data budget may be specified as a monetary value, as a point value, a ranking or any other designation. As such, the budget may be specified up to, but not greater than, the total amount of data and/or bandwidth available (e.g., on a monthly basis). In the case of a monetary input, for example, the data budget may be specified up to, but not greater than, the total cost of the data and/or bandwidth (e.g., on a monthly basis). Hence, the data budget may represent a portion of a total available amount or cost of data to be used within the limits of a service agreement between a network service provider and at least one of the users. By way of example, 4 gigabytes (GB) of a total of 25 GB of data may be budgeted to a first user of a first user device 101a in connection with a social media data service 106. This specifies that the first user may not exceed 4 GB of data when accessing the social media service 106 per the first user device. As another example, the input may assign 3 GB of data to a second user of a second device 101n for accessing the social networking service 106. As such, the budget for the first and second users vary, with the amount afforded the second user and second user device 101n being less than that of the first user and first user device 101a.

As another example, a third user may be budgeted a total of 4 GB of data without reference to a specific user device. Under this scenario, the third user may access the social networking service 106 by way of the first or second devices 101a and 101n up to the allotted amount. This may correspond, for example, to a scenario wherein the first, second and third users are members of a common group (e.g., a family group) that shares one or more devices, one or more network access points, a subscription, or a combination thereof. As yet another example, the first, second and third users may be budgeted a total of $18 dollars, corresponding to 6 GB as a group, for accessing the social networking service 106. Per this scenario, when the first user uses $15 of the budget, only $3 remains for usage by the group cumulatively. Alternatively, the input may be specified to indicate an even allocation of the budget across each of the users and/or user devices 101a-101n (e.g., $18 divided by 3 users and/or devices=$6), corresponding to a device-by-device or user-by-user budget allocation.

It is noted that at least one of the users for providing the input may be a subscriber to the service provider network 109—i.e., has access to the service provider network 109 up to the total amount of data. Alternatively, at least one of the users may have permissions as appropriated by the service provider and/or subscriber along with the necessary credentials (e.g., network access keys, passwords) for accessing the network 109 and assigning a data budget to respective users and/or devices 101 regardless of their subscription status.

In one embodiment, the data usage analysis platform 103 may be configured to monitor the operation of and/or interaction between the user devices 101 and a specified data service 106 with respect to the established data budget. By way of example, the platform 103 may be implemented as a background/running service or process for persistently monitoring data usage data with respect to a specific data service 106. As another example, the platform 103 may operate in the background (e.g., at the user device 101) for identifying whether a given user and/or device is within the specified data budget. This may include monitoring the interaction between the user devices 101 from the point of initiation of a session with the data service 106 to fulfillment of a service request and/or session termination. As such, the data usage analysis platform 103 may be configured to operate in connection with any applications 105a-105n (referred to herein collectively as applications 105) of the user device 101 that communicate with a data service 106 directly or indirectly.

Alternatively, the platform 103 may be configured to perform the monitoring in response to the invocation of specific application programming interface (API) executions, data service calls, or the like. For example, when the API instruction for establishing a communication channel between the service 106 and the calling application 105 is executed, the platform 103 may be activated as well. Under this scenario, the data usage analysis platform 103 may self-initiate and/or self-terminate its monitoring executions responsive to the initiation or termination of an API call at the user device 101 for operating a data service 106. As such, the platform 103 need not run as persistently as a background process of the user device 101 but is rather triggered for execution as needed. It is noted that any means of implementation of the platform 103 may be employed for supporting the monitoring of data usage data, including implementation as a cloud based or hosted solution of the user device 101, as a direct executable of the device 101 for invoking one or more API executions via the device operating system (OS), or a combination thereof.

A use case for depicting the monitoring capabilities of the data usage analysis platform 103 is now described for illustration purposes. By way of example, when the user launches a streaming movie application 105 at the device 101, the application 105 may further initiate a call to a corresponding movie data service 106 that hosts the movie content and other related data to access a specific movie for viewing. As a result of the call, the data usage analysis platform 103 records when the session was established between the calling application 105 and the responding data service 106 over the service provider network 109. In addition, the platform 103 monitors the subsequent exchange of data between the application 105, the device 101 and the data service 106 pursuant to the interaction, including the amount of data transmitted, the rate of transmission of the movie/data, movie/data request fulfillment information, etc., via the network 109. Still further, the platform 103 monitors any contextual information gathered by way of sensors 104a-104n (referred to herein collectively as sensors 104) and subsequently transmitted between the device 101, application 105 and service 106 during the network session. Hence, the platform 103 may identify, monitor and record any data usage data associated with the calling device (e.g., 101a) or calling application (e.g., application 105a) as well as that of any other related calling device (e.g., 101n) or application (e.g., application 105n) that employs the same network access point, subscription credentials, or the like to interact with the movie data service 106 via the network 109.

In one embodiment, the data usage analysis platform 103 may analyze the data usage and generate a report for indicating the data usage data based on the analysis. The report may include various metrics for indicating the individual or cumulative data usage data for the one or more users and/or one or more user devices 101. For example, the report may indicate a rate of consumption/usage of data, an average rate of consumption/usage of data, a number of users and or devices being monitored or comprising a group, a total amount of data and/or corresponding monetary value of the data plan, a remaining amount of data and/or corresponding monetary value available to be spent per the established data budget, occurrences of a user and/or device exceeding or approaching of a limit as set per the data budget, etc. The above described metrics and information may be presented on an individual or cumulative basis for respective users, user devices 101 and/or data services 106.

In addition, the report may be presented as a dashboard, wherein the above described metrics is presented as one or more visual elements, indicators, charts, textual elements, audible or the like. For example, a rate of consumption may be presented visually as a usage meter, as a thermostat reading, as an odometer, etc. Still further, the dashboard may enable the report to be responded to interactively by users as by including/presenting various interactive input elements in connection with the report. The interactive elements may include, for example, one or more knobs, sliding dials, etc., for enabling the user to alter a view of the data and/or adjust the data budget in response to the report. It is noted that per this reporting approach, the data usage analysis platform 103 may present the report and/or dashboard to a user device based on the status or permissions afforded respective users and/or user devices 101 with respect to the service provider network. For example, in the case where the user is the subscriber, the report may be based on the individual users budgeted an amount of data as well as for the group as a whole. In the case where the user is not a subscriber and/or not afforded permissions for budgeting data, this user may be presented with only their individual report metrics.

In one embodiment, the data usage analysis platform 103 may enforce the data budget as a data limit for the service, the one or more users, the one or more devices, or a combination thereof. The enforcement may include one or more of limiting or restricting the operation of the service 106 by a user or a user device. For example, the platform 103 may enable the specification of enforcement settings for indicating one or more time of day restrictions (e.g., the one or more users are not allowed to access a service during weekdays or between the hours of 8 am and 3 pm), one or more service type and/or content type limits (e.g., the one or more users are not allowed to purchase movie content but allowed to purchase music content), one or more purchase limits, one or more spending limits, or a combination thereof.

In addition, the enforcement may include presenting of the report to include a warning message or enforcement message. Per this scenario, the warning message may indicate an individual user, user device 101 or group thereof is approaching the data limit (to within a predetermined threshold). Still further, the platform 103 may present a message for indicating an option for the user to adapt the budget limit in response to the approaching of the data limit. In this case, the user may be presented with various input elements for increasing the budget limit up to, but not greater than, the remaining amount or monetary value of the usable/available data (to within a predetermined threshold), etc. In the latter case, a user (e.g., the subscriber or any other user having established budget data specification permissions) may submit the input.

In one embodiment, the data usage analysis platform 103 may also support and enforce the exchanging, trading or selling of data between respective users of user device 101. Per this approach, the exchange, trade or sale may be performed based on the budget limit associated with a specific user, the current amount of data usage, or a combination thereof. Furthermore, the exchange, trade or sale may be executed manually, such as with respect to a user interface for presenting a report of the data usage activity of other budgeted users or automatically by way of a simple messaging service (SMS) communication. In the former case, a user may initiate the exchange by submitting a request to another user (e.g., via a request action button), such as in response to a display of an amount of data available to the user subject to the request. In the latter case, the SMS message may specify the request. The users to be engaged in the exchange must have permission to do so, i.e., subscriber permission. Alternatively, the subscriber may also be required to validate each exchange, trade or sale before enabling the transaction to occur.

In the case of a sale, a first user may submit a request for a second user to sell an amount of its budgeted data. To procure the data, the first user may offer the second user a number of points, cash credits or other items of designated value. By way of example, the cash credit may be used by the second user towards the purchase of music or movie content associated with a specific vendor, incentive program or the like. As such, the cash credit is debited from a bank/pool of the first user (buyer of the data) and credited towards a bank/pool of the second user accordingly for enabling movie, game and/or music purchases.

In the case of a trade, a first user may offer to trade an amount of its budgeted data to a second user for a period of usage in exchange for usage of the second user's data for a period of usage. By way of example, the first user may be a soccer fan that requires more data during the summer time while the second user is a National Football League (NFL) fan requiring more data during the fall and winter. Resultantly, the users may agree to help each other by allocating a portion of their data to each other for a limited time period or according to a scheduled usage period. The agreement may also include various user conditions, including a condition that the user that enabled use of their data to another may acquire the data back when needed, that the data may be used for specific services only, etc. Still further, trading of data need not be byte-for-byte (e.g., 100 Mb in exchange for 100 Mb). Rather, the first user may demand 200 Mb in return for allocating only 100 Mb due to the high demand for access to their data by all other users.

As another trade example, the first user may initiate a request to trade a portion of their data to the second user as an incentive. This may include allocating a portion of the data based on the occurrence of a birthday of a second user, as a reward, etc. Hence, any of the above described exchange, trade or selling procedures may be initiated on demand.

It is further contemplated, in one embodiment, that the above procedures may be initiated in response to a discovered data need. For example, if a user is in the process of purchasing a movie but realizes their budget is too low to accommodate the request (e.g., in terms of cash or data), the data usage analysis platform 103 may suggest the exchange, trade or selling process. In addition, the platform 103 may specify one or more recommended parties to be involved in the exchange—i.e., those with enough data to enable the user to view the movie. As yet another option, the platform 103 may present the user with an option to request additional data or cash credit from the subscriber (e.g., the owner of the service agreement). Per these approaches, the platform 103 may send a text message or email to the subscriber and process it instantaneously. This enables the user to continue the movie purchase process in real-time or near-real time.

In one embodiment, the data usage analysis platform 103 analyzes the data usage data as gathered with respect to the one or more users and/or one or more user devices 101 relative to a service 106 over time to determine a data usage data pattern. The data usage data pattern may indicate one or more historical tendencies, habits, averages or the like regarding usage of the budgeted data by users, devices and/or groups thereof. As such, this information may be presented as a separate historical report by the platform 103 based on a user specified periodicity (e.g., weekly, monthly or quarterly). Alternatively, the data usage data pattern and historical data usage data results may be presented as part of the above described dashboard, i.e., as a chart.

By way of example, the data usage data pattern may indicate a particular user of a music data service 106 tends to substantially underutilize their data budget. As another example, a data usage data pattern may be determined to indicate a first group of users within a workplace tend to meet the budget limit more rapidly than other groups of users at the same workplace. Per this example, the average rate of data consumption (e.g., bytes per second) of the first group may be determined to exceed all other groups by x percentage. As yet another example, a data usage data pattern may indicate a higher number of enforcement occurrences for a user device belonging to a child than other members of a family group. The data usage pattern may also indicate a typical time of occurrence of said enforcement limits.

In one embodiment, the data usage analysis platform 103 may generate a recommended data budget to associate with the service 106 based on the data usage data patterns. The recommendation may include a message for indicating an increase, decrease or maintenance of a given data budget and may be based on analysis of the patterns. Per this approach, for example, the platform 103 may generate a recommendation to increase the data budget for the above described first group of users within the workplace by 20%. In this case, the increase may be based on known overage tendencies of the group as a whole or may be set accordingly by the employer as an incremental increase limit. As another example, a recommendation may be generated for restricting use of a specific data service during a certain time period with respect to the child having the highest number of enforcement occurrences.

As yet another example, the platform 103 may process real-time or current usage data patterns in order to forecast the amount of unused data of a user before the end of a billing cycle. Per this approach, the subscriber may then allocate the expected unused data to another user that may put the data to use before the data is lost—i.e., in the case where data does not roll over at the end of the cycle. It is contemplated, in future embodiments, that the recommendations may be further generated based on current or historical context information regarding the one or more users and/or devices 101, including temporal information, calendar/activity information, location information, etc.

As noted above, the reports generated by the data usage analysis platform 103 may be rendered to the display of a requesting user device upon demand for presenting real-time/ current data usage data, in response to the approaching of a limit as a warning message, as a dashboard, etc. In addition to being presented for review by users, it is contemplated that the reports may be stored and maintained in database 107b by the platform 103 for future analysis by the provider of the service provider network 109, the data service providers, application providers or the like. Said parties may analyze the data, with respect to established privacy and data sharing policies in an effort to identify the most popular applications or data services, peak usage times of said services, for performing capacity planning, etc.

In one embodiment, the data usage analysis platform 103 may operate in connection with any type device capable of interfacing with or accessing a data service 106 via a network 109. This may include, for example, a mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. In addition, user devices 101 may facilitate various input means for receiving information from a user for configuring operation of the data usage analysis platform 103, including touch screen capability, keyboard and keypad data entry, voice-based input mechanisms and the like. Any known and future implementations of user devices 101 are applicable.

In certain embodiments, user devices 101a-101n, the data usage analysis platform 103, the applications 105, the data services 106 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
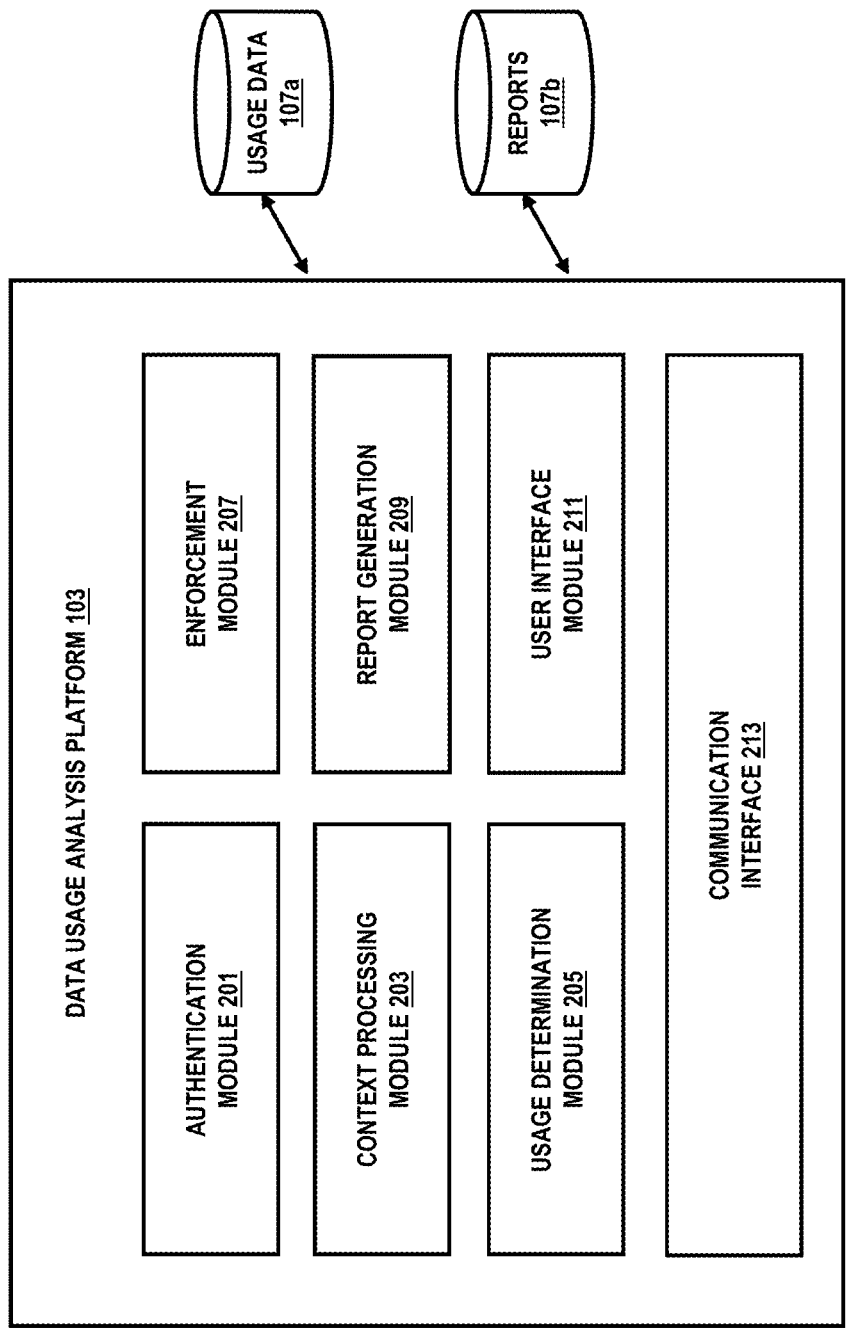
FIG. 2 is a diagram of a data usage analysis platform, according to one embodiment.

FIG. 2 is a diagram of a data usage analysis platform 103, according to one embodiment. The platform 103 includes various executable modules for performing one or more computing, data processing and network based instructions that in combination provide a means of managing the amount of data spent by one or more user devices on one or more services. Such modules can be implemented in hardware, firmware, software, or a combination thereof. By way of example, the data usage analysis platform 103 may include an authentication module 201, a context processing module 203, a usage determination module 205, an enforcement module 207, a report generation module 209, a user interface module 211 and a communication interface 213. In addition, the platform 103 may also access data usage data from a usage database 107a as well as any generated report and/or data usage data patterns from the reports database 107b.

The authentication module 201 authenticates users and user devices 101 for interaction with the data usage analysis platform 103. Authentication may occur based, at least in part, on processing of a specified authentication credential, password, key or the like as generated in connection with a specific user name, device identifier, subscriber identifier, network address or the like. As such, the authentication module 201 may allow or prohibit users from specifying a data budget based on whether or not the user is a registered subscriber to a data plan of a provider of the service provider network 109. In addition, the authentication module may receive an input for specifying the one or more users and/or user devices to be monitored for determining data usage data.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 215). Subscription data 217 for respective subscribers, which contains pertinent user and/or device profile data, may be cross referenced as part of the login process. Alternatively, the login process may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier.

The context processing module 203 may operate in connection with the authentication module 201 to process contextual information regarding the one or more users, one or more devices, or a combination thereof that access a specific data service 106. By way of example, the context information may include temporal information, location information, session identifier information, or the like for indicating a current activity of a user and/or user device as they engage with a data service 106. The context information may also be shared with the usage determination module 205, enforcement module 207 and report generation module 209 for determining a time and/or duration of use of a data budget, enabling the enforcement of a data limit and for refining the data usage data reports respectively.

The usage determination module 205 may operate in connection with the enforcement module 207 to monitor data usage data as spent by a user. By way of example, the usage determination module 205 may monitor the interaction between the one or more specified users, user devices 101, or a group thereof. This may include monitoring one or more of the following: the launch of the service 106, the initiation of the communication session via the network 109 between the user device 101 and the service 106, the exchange of data between the user device 101 and the service 106, the fulfillment of a service request pursuant to the exchange, the termination of the session, etc. Per the monitoring, the module 205 may also tabulate a number, monetary value and/or amount of data transmitted as well as compute a rate of data transfer for the one or more users and/or one or more devices on an individual or cumulative basis.

The enforcement module 207 may receive and process the input for establishing the budget data for respective users, user devices 101 and/or groups thereof. In addition, the module 207 enforces the budget data as a data limit. By way of example, the budget data may be specified by a user as a monetary value, as a data size, as a data rate, etc., up to but not greater than the total amount of data and/or total monetary value of the data plan of the subscriber. In addition, the enforcement module 207 may execute various enforcement measures in response to the determination of an approaching of the data limit. The measures may include, for example, limiting or restricting the operation of the service 106 by a user or a user device 101, invoking execution of a report generation module 209 to generate and present a report for indicating a warning message or enforcement message, presenting a message for indicating an option for the user to adapt the budget limit in response to the approaching of the data limit, etc.

The report generation module 209 may operate in connection with the usage determination module 205 to determine data usage data patterns associated with the one or more users and/or one or more user devices 101. The module 209 may further analyze the patterns to determine one or more historical tendencies, habits, averages or the like regarding usage of the budgeted data by users, devices and/or groups thereof. Based on this analysis, the data usage data pattern and historical data usage data results may be triggered for presentment as a report via the report generation module 209. In addition, the report generation module may generate one or more recommended actions to be taken based on the analysis, including an increasing or decreasing of a data budget for the one or more users and/or one or more user devices 101.

The user interface module 211 enables presentment of a graphical user interface for presenting the reports, the data usage data, and data usage data patterns, etc. By way of example, the user interface module 215 generates the interface in response to application programming interfaces (APIs) or other function calls corresponding to a browser application, web portal application, or other network access/interface of the user devices 101. In addition, the user interface module 211 may operate in connection with a dedicated application 105 of a data service 106 to be called by the device 101. As such, the user interface module 211 may enable execution of various graphics primitives for rendering an interactive dashboard.

The communication interface 213 enables formation of a session over a network 109 between the data usage analysis platform 103 and the user device 101 as it interacts with a data service 106. By way of example, the communication module 213 executes various protocols and data sharing techniques for enabling collaborative execution between a subscriber's user device 101 (e.g., mobile devices, laptops, smartphones, tablet computers, desktop computers) and the platform 103.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The above presented modules and components of the data usage analysis platform 103 can be implemented in hardware, firmware, software, or a combination thereof. Though depicted as a separate entity in FIG. 1, it is contemplated that the platform 103 may be implemented for direct operation by respective user devices 101. Hence, as noted, the platform 103 may generate direct signal inputs by way of the operating system of the user device for interacting with the browser application 105 and accessing content 109a-109n. Of further note, modules 201-213 may be implemented for operation by respective user devices as a platform 103, cloud based solution, hosted solution or a combination thereof.

Figure 3C:
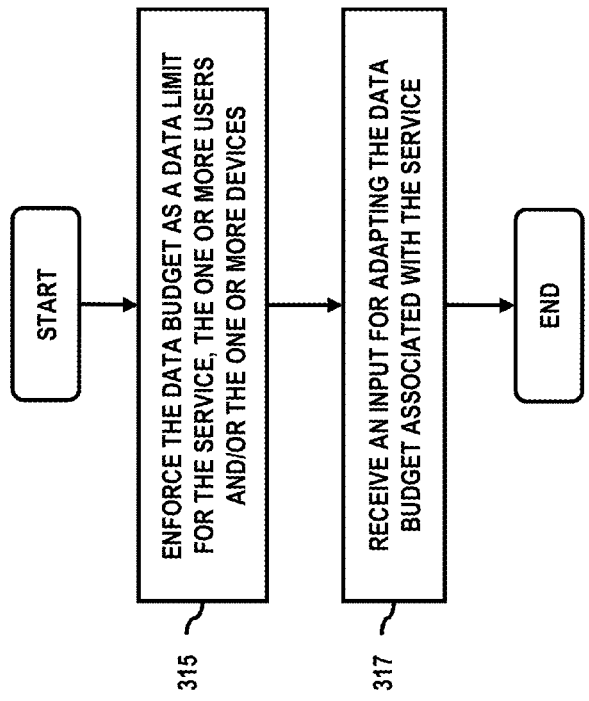
Figure 6:
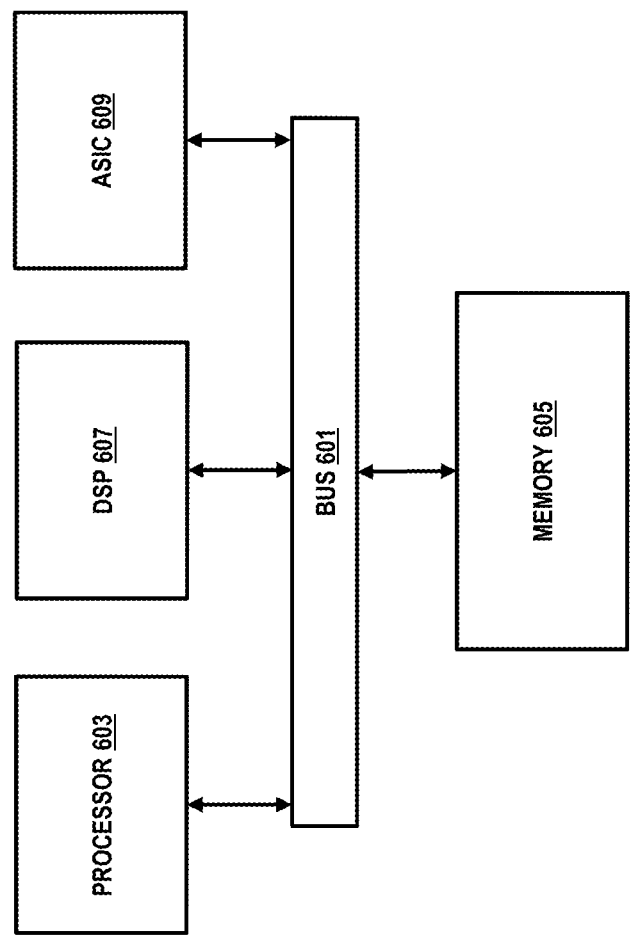
FIG. 6 is a diagram of a chip set that can be used to implement an embodiment of the invention.

FIGS. 3A-3C are flowcharts of processes for managing the amount of data spent by one or more user devices on one or more services, according to various embodiments. In one embodiment, the data usage analysis platform 103 performs the processes 300, 306 and 314 and is implemented in, for instance, a chip set including a processor and a memory as shown in FIG. 6.

In step 301 of process 301 (FIG. 3A), the data usage analysis platform 103 receives an input for specifying a data budget associated with a service. The service may be a data service 106 that is accessible by or operable upon the one or more devices. Also, as noted previously, the input may specify the data budget for one or more users of the one or more devices individually or cumulatively on a user-by-user basis, a device-by-device basis, or a combination thereof. In steps 303 and 305 respectively, the platform 103 monitors the data usage data associated with the service across the one or more devices and presents a report of the data usage data with respect to the data budget.

In step 307 of process 306 (FIG. 3B), the data usage analysis platform 103 monitors the data usage data across the one or more devices respectively for the one or more users, the one or more devices, or a combination thereof. By way of example, the report specifies the data with respect to the data budget for the one or more users, the one or devices, or a combination thereof individually or cumulatively. As noted, the report may depict current and/or historical data usage data for the one or more devices. Also, as mentioned previously, the data budget may be specified as a monetary value, as a percentage, as an amount of data, or a combination thereof of a total amount of data associated with the one or more users, the one or devices, or a combination thereof individually or cumulatively.

In another step 309, the data usage analysis platform 103 determines a data usage data pattern for the service, another service, the one or more users, the one or more devices, or a combination thereof based on the monitoring of the data usage data for a specified period. As noted, the data usage data pattern may include information for indicating a tendency, behavior, average or the like with respect to a given user and/or user device with respect to a specified service 106. In step 311, the platform 103 processes the data usage data to predict future data usage data for the service, another service, the one or more users, the one or more devices, or a combination thereof. Hence, the data usage data pattern may be used to generate the prediction.

Per step 313, the data usage analysis platform 103 generates a recommended data budget to associate with the service based on the data usage data pattern. As mentioned previously, the report may include the recommended data budget, the data usage data pattern, the data usage data, one or more dashboard elements, or a combination thereof.

In step 315 of process 314 (FIG. 3C), the data usage analysis platform 103 enforces the data budget as a data limit for the service, the one or more users, the one or more devices, or a combination thereof. The data limit may be up to but not greater than the total amount of data available for usage by the one or more users, the one or more user devices, the services or a combination thereof. Of note, the report may further include a message regarding (a) the enforcing of the data limit, (b) an approaching of the data limit, or (c) a combination thereof in association with the one or more users of the one or more devices individually or cumulatively on a user-by-user basis, a device-by-device basis, or a combination thereof. In another step 317, the platform 103 receives an input for adapting the data budget associated with the service. As noted, the input for adapting the data budget may be provided by at least one of the one or more users or automatically by the platform 103 in response to the report.

FIGS. 4A-4F are diagrams of user interfaces utilized in the processes of FIGS. 3A-3C according to various embodiments. For the purpose of illustration, the diagrams are described with respect to an exemplary use case of different users (e.g., Joe, Kay and Leo) of different user devices that are configured to interact with various services. Per this example, the different users have access to a network via a subscriber (Joe) for running the one or more services. Each of the user devices are configured to interact with the data usage analysis platform 103 to enable the monitoring and managing of data usage data for the different devices and/or users accordingly. In addition, while not shown, each of the user devices and/or corresponding users are associated with one another via the platform for establishing sharing and monitoring of the data.

Figure 4A:
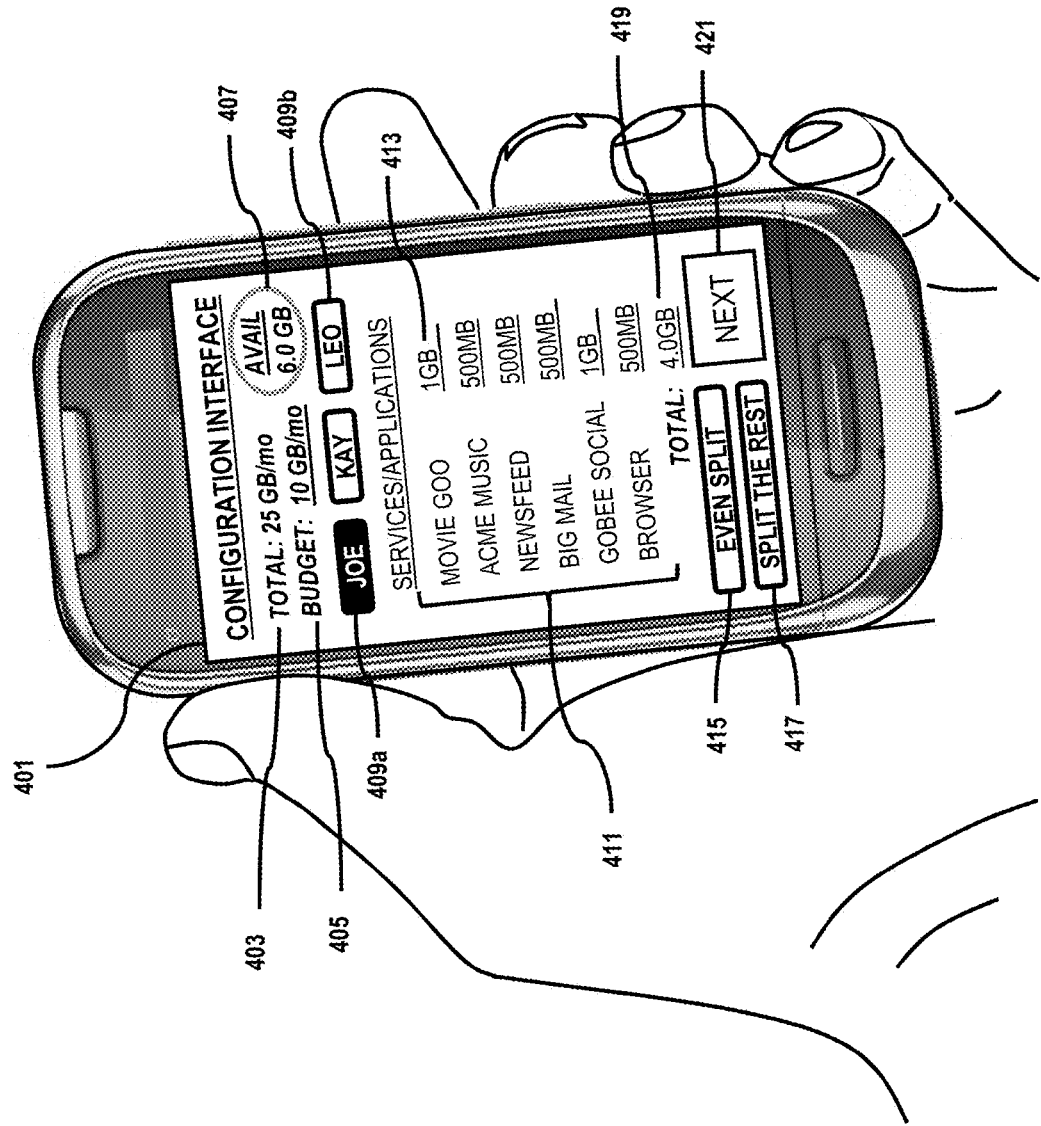
Figure 4B:

In FIG. 4A, Joe accesses a configuration interface 401 of the data usage analysis platform 103. The configuration interface presents him with information regarding his data available data 403, which in this case is 25 GB per month. In addition, an input option 405 is presented for enabling him to specify a budget data amount for the group. In this example, Joe specifies a data budget of 10 GB per month. Also presented are user selection buttons for enabling Joe to select a specific user device to configure for access to the budgeted data 405. By way of example, Joe may configure his own user device by selecting button 409a, which also results in the presentment of a list 411 of services that may be accessed via the network.

Under this scenario, the list of services include a movie streaming service (e.g., Movie Goo), a music streaming service (e.g., ACME Music), a news content service (e.g., Newsfeed), a mail service (e.g., Big Mail), a social networking service (e.g., GoBee Social) and a browser application for accessing content. Also presented next to each list entry is an input field, i.e., input field 413, for enabling Joe to specify an amount of data to be budgeted to the service by the user. In this case, Joe specifies the highest budget data amounts to the movie streaming service (1 GB) and the social networking service (1 GB), both of which are the services he most often uses via his device 400. Still further, he budgets 500 MB to the remaining services, for a total budgeted amount 419 of 4 GB.

Still further, Joe may further modify the budgeted amounts by adjusting the inputs manually or by way of action buttons 415 and 417. The action buttons include an EVEN SPLIT action button 415, which upon selection, splits the user specified user budgeted amount 419 across each of the services in the list 411 evenly. Alternatively, the SPLIT THE REST action button 417 splits the remaining data of the total user budgeted amount 419 evenly across those services for which a budget is not already specified. In this case, Joe selects action button 417 after entering the amounts for Movie Goo and GoBee Social, which results in the even allocation of the remaining 2 GB across the remaining services (e.g., 500 MB).

An indicator 407 is also updated to reflect a remaining amount of data available for use by the one or more other users (e.g., Kay and Leo) and/or user devices. It is noted that the indicator 407 may also be dynamically adapted as the current spending of data occurs with respect to any of the users during the configuration. For example, while Joe is updating the budget, Kay may be currently watching a video resulting in the spending of 250 MB. As such, indicator 407 would specify that only 5.75 GB of data is currently available for use. The user may opt to adapt the group budget limit accordingly based on this information as well.

Once the budget data settings are established, Joe may select the NEXT action button 421 in order to establish additional configuration settings. The settings include various options 423 for enforcing the data budget for a given service, including an option to alert users of the data usage data or approaching of a data limit. In addition, a threshold input may be specified for establishing a condition for execution of the alert based on an amount of data usage (e.g., a threshold of 10% results in generation of an alert once the data usage/consumption is within 10% of the budgeted value for a service. Still further, the settings include an option to activate a dashboard view as well as an option to activate one or more restrictions.

As another option, the user may opt to save data usage data for a specified period time as historic data. By selecting this option, the data usage analysis platform 103 stores data usage data, patterns and other relevant information to the reports database 107b for subsequent processing. Another option includes an option to allow any of the users of the group, aside from the subscriber, to make budget data changes. Selection of this option enables Kay and Leo to adapt the budget as they see fit to within the group budget limit 405, based on availability, with the full permission of the subscriber (Joe). It is noted that these options 423 may be activated by way of one or more corresponding checkboxes (e.g., checkbox 425 for activating alerts). Once selections are made, Joe may select another user to configure (e.g., via button 409b) or can go back to the previous configuration interface by selecting the BACK action button 427. Alternatively, Joe may save the current settings by selecting the SAVE action button 429.

Figure 4C:
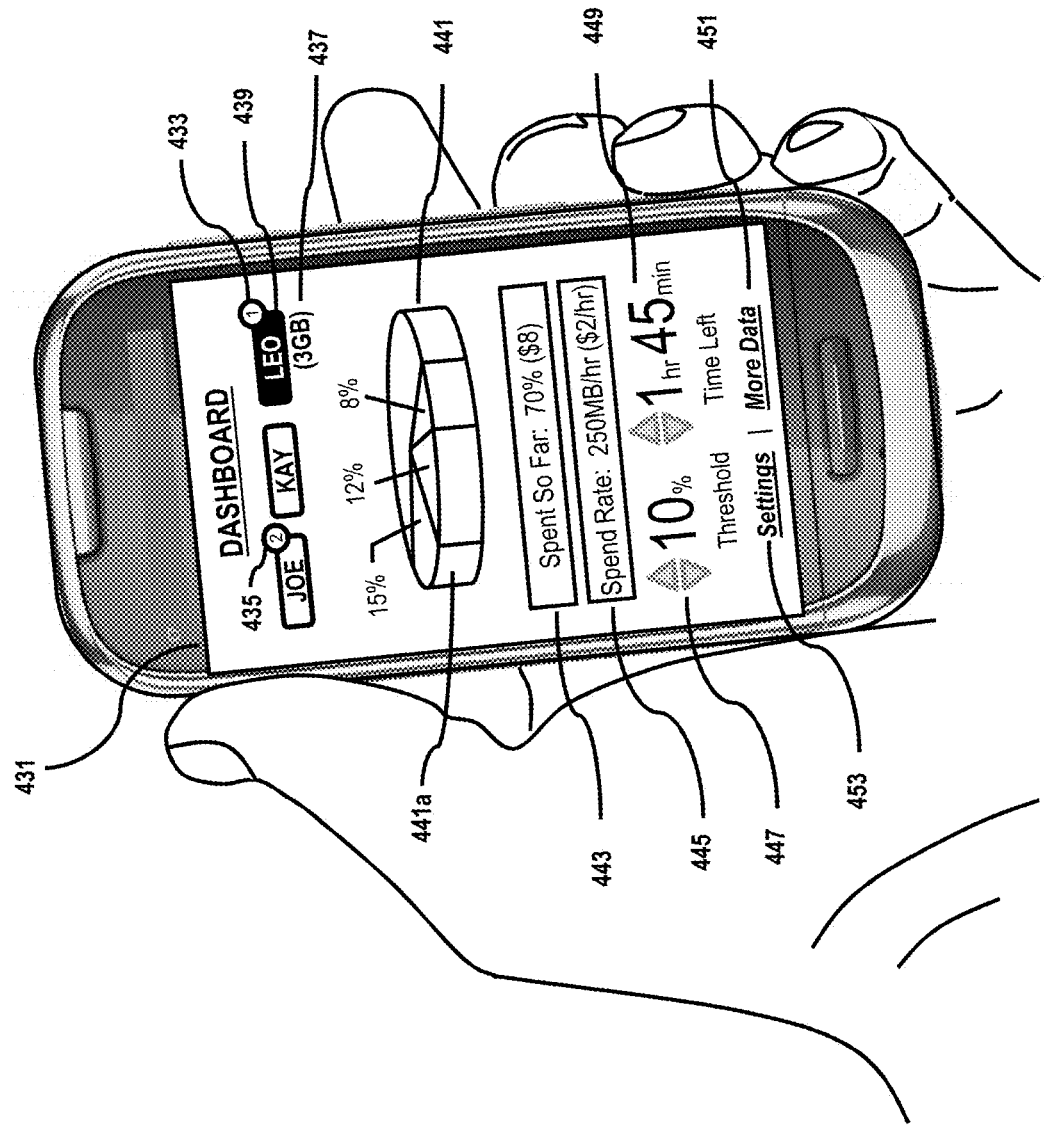

In FIG. 4C, Joe is presented with a dashboard interface 431 for reviewing a report regarding the use of data for the group as a whole or for each individual. In this example, Joe notices Leo is ranked number one in terms of data usage by way of a ranking indicator 433 while he himself is ranked number 2 (per indicator 435). Resultantly, Joe selects user selection button 439 in order to review the data usage data report for Leo. Upon selection, the budget data 437 for Leo is shown along with a real-time pie chart 441 for depicting a breakdown of the current data usage data for each service. In addition, metrics 443 and 445 are presented for indicating a current amount of data used by Leo amongst all the services along with a current rate of spending. Under this scenario, the metrics are presented as a percentage of the overall data budget 437 along with the corresponding monetary value of the data usage. Joe may adapt the format of the report by selecting the settings link 453. In addition, Joe may highlight a segment of the pie chart 441, i.e., segment 441a, in order to view metrics 443 and 445 and/or dashboard controls 447 and 449 for only the selected service (e.g., Movie Goo) versus the cumulative results.

Also presented per the dashboard 431 is a threshold adjustment dial 447. Per this control, Joe has the option to increase or decrease a current threshold setting of 10% as established with respect to Leo's device. In the case where the current rate of spending is deemed to be high, Joe may decide to increase the threshold as a means of triggering the alerting and/or enforcement options soon than the current threshold setting may allow. Also presented is a time availability adjustment dial 449, which allows Joe to adapt the duration of time for operating a service at the current spending rate 445. It is noted that the time availability information may automatically be adjusted by the platform 103 in response to adapting of the threshold value, in response to further consumption of data, etc. Furthermore, Joe may select the more data link 451 in order to select additional data to be presented to the dashboard 431.

Figure 4D:
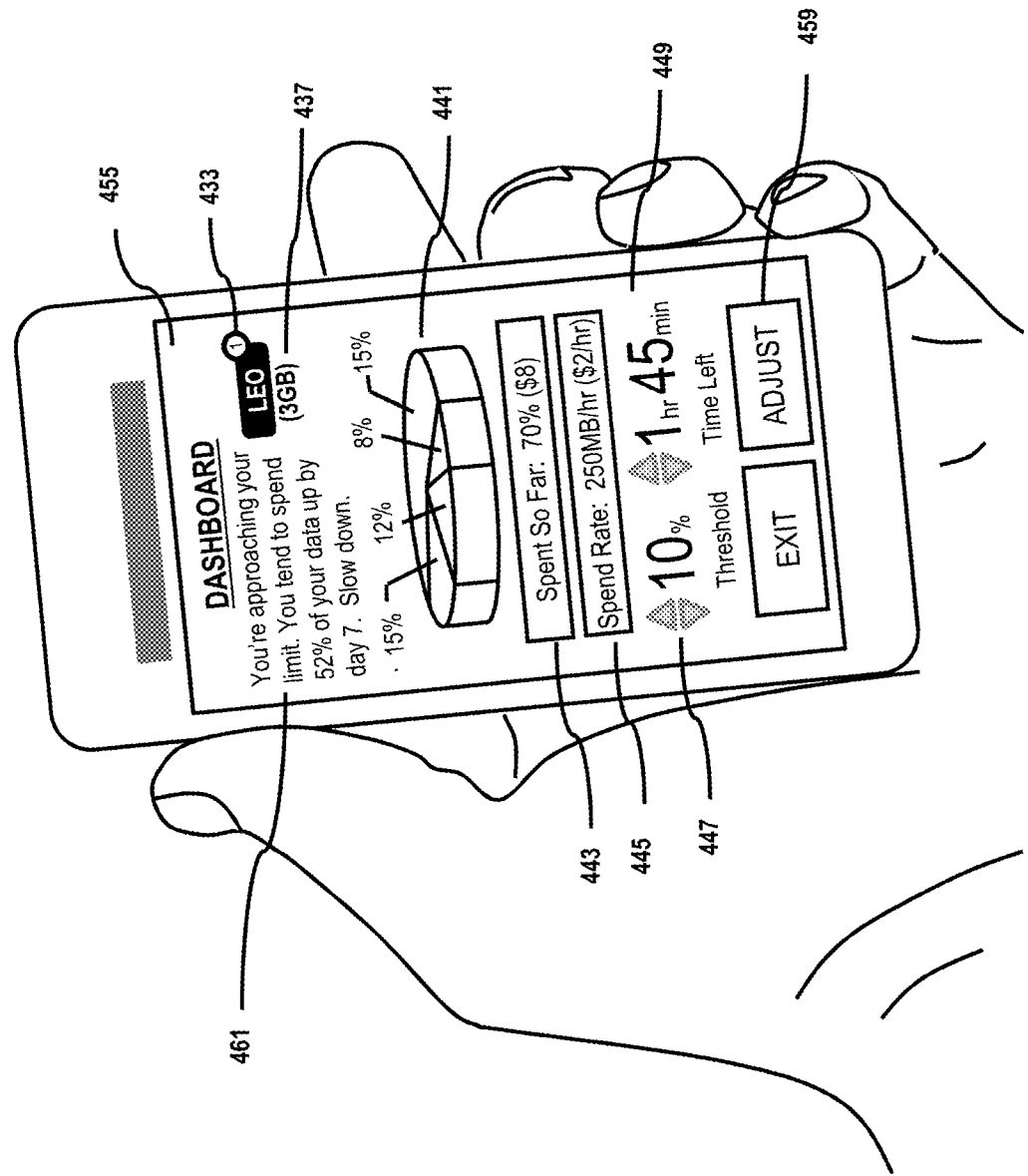

In FIG. 4D, Leo is presented with a dashboard for presenting his data usage data activity. In this scenario, based on the permissions afforded him by the subscriber (Joe), Leo is only able to review data usage data pertaining to his activity and not that of the other users that access the same services. Thus, Leo is presented with information for indicating his current activity ranking 433 as the number one consumer of shared data. Also presented is the pie chart view 441 for demonstrating his overall data usage activity across different data services and metrics for indicating his current level of data usage data 443 and rate of spending 445. Still further, per this scenario and the permissions established by Joe, Leo is able to make adjustments to the established threshold level and time availability via dashboard controls 447 and 449 respectively.

Leo is also presented with a recommendation 461 for indicating a suggested activity/action he is to take based on his determined data usage data. In addition, the recommendation 461 specifies a historical fact regarding Leo's typical data consumption based on analysis of historical data collected over a period of time. Of note, one or more restrictions may also be imposed upon Leo depending on the settings established by Joe with regard to his data usage data and/or patterns. Still further, Joe is presented with an ADJUSTMENT action button 459 for enabling him to adjust his budget data. Upon selection of this action button, Joe may be presented with an input (not shown) for increasing and/or decreasing the amount of data budgeted to him. It is noted that, in certain implementations, the adjustment may be submitted as a request to Joe that must be subsequently approved. Once approved, the data budget indicator 437 is updated accordingly.

In FIGS. 4E-4F, an email report is delivered to Joe on a monthly basis for indicating the overall data usage data activity on a user-by-user and/or device-by-device basis. In this example, the message is automatically generated by way of a scripting agent of the data usage analysis platform 103. The report 463 includes information for indicating current plan details 465, including the name of the subscriber, the overall data plan limit and the monetary value (cost) of the data plan on a monthly basis. The plan details 465 also indicate which users and devices are registered to access the data plan, which in this case is only devices 401 and 418. Thus, Kay shares a device with Joe.

The report also indicates the current budget settings 467, which includes budget data associated with the group (e.g., 10 GB/mo) as well as the settings for each of the group members individually. Of note, the budget is presented as both an amount of data budgeted as well an equivalent monetary value. As such, Joe is able to identify the relative value of the data and portion of the cost afforded each of the users. In addition, a chart 473 is presented for indicating the data usage activity for the month. Joe is able to readily identify the low level of activity throughout the month by Kay and the high level of data usage data for Leo. Alternatively, the chart 473 may be a historical plot depicting the activity levels of the respective users over a longer time period.

The report also presents a breakdown of the data usage for the month on a user-by-user basis (e.g., 469 and 471). This section of the report indicates the device and corresponding user as well as the budget data associated with the user and/or device. The budget data is presented as a data amount, a monetary value (e.g., dollar amount) and as a percentage of the overall available data of the subscriber plan. In addition, the specific services/activities are also specified. Still further, the total spending amount and amount of the budgeted data that went unspent 475 is presented along with a monthly average spending report for indicating the user rank information. By way of this information, Joe may readily identify that his spending for this month is above his historical average. Upon scrolling down (not shown), the report may further specify the data usage data breakdown for Kay and Leo as well for the plurality of services they may utilize.

In FIG. 4F, the backend of the report is shown to include an analysis report 477. The analysis report may be generated by the data usage analysis platform 103 based on known analysis metrics, criteria, data mining techniques and the like for identifying various trends, tendencies and patterns amongst the user and/or user devices. In this example, the analysis includes a determination that the subscriber is the second ranked user of data amongst services as well as a determination that Kay only uses her data budget on a limited basis during specific months. The analysis also reveals that Leo tends to have restrictions enforced due to his data usage data patterns and history.

The report therefore presents one or more recommendations/considerations 479 for the user to execute based on the analysis 477. Per this example, the recommendations include reducing the budget data for Joe to only 2.5 GB given that his typical data usage is only 2.2 GB. Another recommendation is to increase Leo's budget data to 4.0 GB given his tendency to spend up to the data limit every month. Still further, given the limited activity of Kay, a recommendation is presented for indicating a reduced data budget be assigned to Kay during certain months while an increased data budget be assigned to her during her most active months.

It is noted that the user may customize the report to their liking by way the configuration interface of the data usage analysis platform 103. This may include, for example, adjusting the format of the report, including or excluding certain information, enabling forwarding of the report to other users on an individual basis and adjusting the frequency of generation of the report. Still further, while presented in this example as an email report at the discretion of the subscriber, it is noted that the report may be presented in dashboard form only. The data usage analysis platform 103 provides a flexible, convenient means of managing and enforcing a data budget for one or more devices and/or users relative to a service.

The processes described herein for managing the amount of data spent by one or more user devices on one or more services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
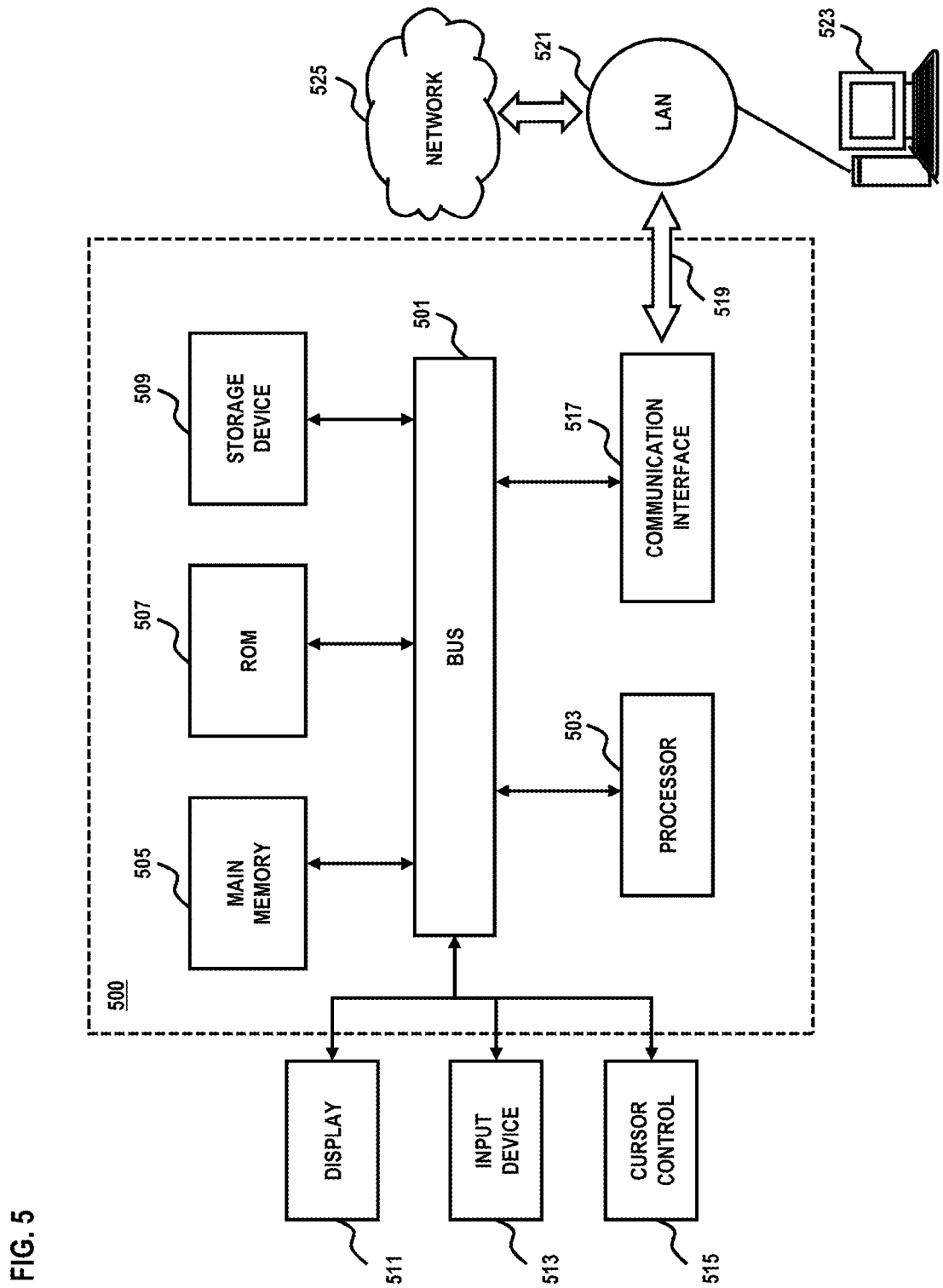
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4F, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to manage the amount of data spent by one or more user devices on one or more services as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of managing the amount of data spent by one or more user devices on one or more services.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to manage the amount of data spent by one or more user devices on one or more services. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving an input that specifies a data budget associated with a service, wherein the service operates on one or more devices;
   monitoring data usage associated with the service across the one or more devices, the monitoring including determining a particular rate at which data is being used by a particular device, of the one or more devices;
   presenting a report of the data usage with respect to the data budget, the report including an indication of the particular rate at which data is being used by the particular device;
   receiving an input that specifies a maximum duration that the particular device is permitted to use data at the particular rate; and
   enforcing the maximum duration that the particular device is permitted to use data at the particular rate.

2. The method of claim 1, wherein the one or more devices are a group of devices associated with an overall data budget, wherein the data budget, based on the received input that specifies the data budget, is specified on a device-by-device basis, wherein a cumulative amount of the data budgets, for the one or more devices, is equal to or less than the overall data budget.

3. The method of claim 1,
   wherein the report specifies data usage by each device, of the one or more devices.

4. The method of claim 3, wherein the data budget is specified as a monetary value, or as a percentage, of a total amount of data associated with the one or more devices.

5. The method of claim 1, further comprising:
   processing the data usage to predict future data usage for the particular device.

6. The method of claim 5, further comprising:
   generating a recommended data budget to associate with the particular user device based on the predicted future data usage,
   wherein the report includes at least one of:
      the recommended data budget, or
      the predicted future data usage.

7. The method of claim 1, wherein the enforcing comprises:
   enforcing the maximum duration as a data limit for the particular device, whereby the particular device is precluded from using data at the particular rate after expiration of the maximum duration,
   wherein the report includes a message regarding at least one of:
      the enforcing of the maximum duration, of data usage at the particular rate, with respect to the particular device, or
      an approaching of the maximum duration, of data usage at the particular rate, by the particular device.

8. The method of claim 1, further comprising:
   receiving an input for adapting the data budget associated with the service,
   wherein the input is provided in response to the report.

9. The method of claim 8, wherein at least one of the one or more users is a subscriber to a service provider network for operating the service and the input for specifying the data budget, for adapting the data budget, or a combination thereof.

10. The method of claim 1, wherein the one or more devices are associated with an overall data budget that is specified by an agreement between a network service provider and at least one user of the one or more devices.

11. An apparatus comprising a processor configured to:
   receive a user input that specifies a data budget associated with one or more devices;
   monitor data usage associated with the one or more devices, the monitoring including determining a particular rate at which data is being used by a particular device, of the one or more devices;
   present a report of the data usage with respect to the data budget, the report including an indication of the particular rate at which data is being used by the particular device;
   receive an input that specifies a maximum duration that the particular device is permitted to use data at the particular rate; and
   enforce the maximum duration that the particular device is permitted to use data at the particular rate.

12. The apparatus of claim 11, wherein the one or more devices are a group of devices associated with an overall data budget, wherein the data budget, based on the received input that specifies the data budget, is specified on a device-by-device basis, wherein the cumulative data budgets, for the one or more devices, are equal to or less than the overall data budget.

13. The apparatus of claim 11,
   wherein the report specifies data usage by each device, of the one or devices.

14. The apparatus of claim 13, wherein the data budget is specified as a monetary value, or as a percentage of a total amount of data associated with the one or more devices.

15. The apparatus of claim 11, wherein the processor is further configured to:
   process the data usage data to predict future usage for the particular device.

16. The apparatus of claim 15, wherein the processor is further configured to:
   generate a recommended data budget to associate with the particular user device based on the predicted future data usage,
   wherein the report includes at least one of:
      the recommended data budget, or
      the predicted future data usage.

17. A system comprising:
   a data usage analysis platform configured to:
      receive a user input that specifies a data budget associated with a particular type of service, out of a plurality of types of services, wherein the plurality of types of services operate on one or more devices, of a group of devices that are associated with an overall data budget,
      the data budget, associated with the particular type of service, being specified for each device of the one or more devices, wherein the cumulative data budgets, specified for the group of devices, are less than or equal to the overall data budget associated with the group of devices;

monitor data usage data associated with the service across the one or more devices, the monitoring including determining a particular rate at which data is being used by a particular device, of the group of devices;

receive an input that specifies a maximum duration that the particular device is permitted to use data at the particular rate; and enforce the maximum duration that the particular device is permitted to use data at the particular rate.

18. The system of claim 17, wherein the data usage platform is further configured to:

enforce the data budget, associated with the particular type of service, for each device, of the group of devices, the enforcing including at least one of:

generating an alert that at least one device, of the group of devices, has exceeded the data budget for the particular type of service, or precluding the at least one device from using data to access the particular type of service, after exceeding the data budget for the particular type of service.

19. The system of claim 17, wherein the plurality of types of services include at least two of:

a movie streaming service,
a music streaming service,
a news content service,
a mail service, or
a social networking service.

20. The system of claim 17, wherein the overall data budget is specified by an agreement between a network service provider and at least one user of the one or more devices.

* * * * *